US007827607B2

(12) United States Patent
Sobel et al.

(10) Patent No.: US 7,827,607 B2
(45) Date of Patent: *Nov. 2, 2010

(54) ENHANCED CLIENT COMPLIANCY USING DATABASE OF SECURITY SENSOR DATA

(75) Inventors: William E. Sobel, Stevenson Ranch, CA (US); Bruce McCorkendale, Manhattan Beach, CA (US)

(73) Assignee: Symantec Corporation, Mountain View, CA (US)

( * ) Notice: Subject to any disclaimer, the term of this patent is extended or adjusted under 35 U.S.C. 154(b) by 1018 days.

This patent is subject to a terminal disclaimer.

(21) Appl. No.: 11/271,656

(22) Filed: Nov. 9, 2005

(65) Prior Publication Data

US 2006/0070129 A1   Mar. 30, 2006

Related U.S. Application Data

(63) Continuation-in-part of application No. 10/305,622, filed on Nov. 27, 2002, now Pat. No. 7,249,187.

(51) Int. Cl.
*G06F 21/00* (2006.01)

(52) U.S. Cl. .............................. 726/22; 726/23; 726/24; 726/25; 726/26

(58) Field of Classification Search ............... 726/22–25
See application file for complete search history.

(56) References Cited

U.S. PATENT DOCUMENTS

| | | | |
|---|---|---|---|
| 5,987,524 A | 11/1999 | Yoshida et al. | |
| 6,073,242 A | 6/2000 | Hardy et al. | |
| 6,393,484 B1 | 5/2002 | Massarani | |
| 6,490,493 B1 * | 12/2002 | Dharnipragada | 700/97 |
| 6,490,679 B1 | 12/2002 | Tumblin et al. | |
| 6,499,110 B1 | 12/2002 | Moses et al. | |
| 6,789,215 B1 * | 9/2004 | Rupp et al. | 714/38 |
| 6,993,785 B1 * | 1/2006 | Na | 725/80 |
| 7,020,573 B2 * | 3/2006 | Wheeler et al. | 702/121 |
| 7,185,359 B2 | 2/2007 | Schmidt et al. | |
| 7,240,368 B1 | 7/2007 | Roesch et al. | |
| 7,308,712 B2 * | 12/2007 | Banzhof | 726/22 |

(Continued)

OTHER PUBLICATIONS

"BigFix® Announces Support for Network Access Protection Technology from Microsoft," BigFix, Inc., Jul. 13, 2004, [online] [Retrieved on Mar. 31, 2006] Retrieved from the Internet<URL:http://www.bigfix.com/press/news/pr_071304.html>.

(Continued)

*Primary Examiner*—Carl Colin
(74) *Attorney, Agent, or Firm*—Fenwick & West LLP

(57) ABSTRACT

Security sensor data from intrusion detection system (IDS) sensors, vulnerability assessment (VA) sensors, and/or other security sensors is used to enhance the compliancy determination in a client compliancy system. A database is used to store the security sensor data. In one particular embodiment, a list of device compliance statuses indexed by corresponding identifiers (e.g., IP/MAC addresses) combined from IDS, VA, and/or other security sensing technologies is made available as a non-compliance database for query, so that clients and other compliancy authentication elements can tell that a particular client appears to be out of compliance. A client-side self-policing compliance system is enabled, and can be used in conjunction with automated endpoint compliance policy configuration to reduce system administrator burden.

20 Claims, 5 Drawing Sheets

U.S. PATENT DOCUMENTS

| | | | |
|---|---|---|---|
| 7,337,224 B1 | 2/2008 | Van Horne, III et al. | |
| 7,360,237 B2 | 4/2008 | Engle et al. | |
| 7,424,384 B2* | 9/2008 | Wheeler et al. | 702/121 |
| 7,472,422 B1* | 12/2008 | Agbabian | 726/25 |
| 7,509,676 B2* | 3/2009 | Trueba | 726/22 |
| 2002/0025031 A1 | 2/2002 | Maeda et al. | |
| 2002/0042832 A1 | 4/2002 | Fallentine et al. | |
| 2002/0162017 A1 | 10/2002 | Sorkin et al. | |
| 2003/0154394 A1* | 8/2003 | Levin | 713/200 |
| 2004/0139227 A1 | 7/2004 | Takeda | |
| 2005/0005129 A1* | 1/2005 | Oliphant | 713/182 |
| 2005/0216957 A1* | 9/2005 | Banzhof et al. | 726/25 |
| 2005/0229256 A2* | 10/2005 | Banzhof | 726/25 |
| 2005/0246767 A1* | 11/2005 | Fazal et al. | 726/11 |
| 2005/0262086 A1* | 11/2005 | Ta et al. | 707/9 |
| 2005/0278775 A1* | 12/2005 | Ross | 726/2 |
| 2006/0101520 A1* | 5/2006 | Schumaker et al. | 726/25 |
| 2006/0230437 A1 | 10/2006 | Alexander Boyer et al. | |
| 2006/0259960 A1 | 11/2006 | Kondo | |

OTHER PUBLICATIONS

BigFix Client Compliance: Cisco NAC, BigFix, Inc., Apr. 25, 2005, [online] [Retrieved on Mar. 31, 2006] Retrieved from the Internet<URL:http://www.satisnet.co.uk/downloads/bigfix/bigfix_cisco_nac.pdf>.

"BigFix® Closes the "Scan & Block" Remediation Gap with Expanded Endpoint Security Offerings," BigFix, Inc., Oct. 7, 2004, [online] [Retrieved on Mar. 31, 2006] Retrieved from the Internet<URL:http://www.bigfix.com/press/news/pr_100704.html>.

Walder, Bob, "Intrusion Detection Systems," TechOnLine, 1996-2006, [online] [Retrieved on Mar. 31, 2006] Retrieved from the InternetURL:http://www.techonline.com/community/ed_resource/feature_article/20645>.

Langston, R., "Network Access Control Technologies and Sygate Compliance on Contact," Sygate Technologies, Inc., 2005, [online] [Retrieved on Jul. 31, 2006] Retrieved from the Internet<URL:http://www.softwarespectrum.com/symantec/docs/WP-Sygate-Network-Access-Control.pdf>.

United States Office Action, U.S. Appl. No. 11/325,762, Dec. 24, 2009, 16 pages.

United States Office Action, U.S. Appl. No. 11/325,762, May 13, 2010, 17 pages.

* cited by examiner

ENHANCED CLIENT COMPLIANCY USING DATABASE OF SECURITY SENSOR DATA

RELATED APPLICATIONS

This application is a continuation-in-part of U.S. application Ser. No. 10/305,622, filed Nov. 27, 2002 now U.S. Pat. No. 7,249,187, titled "Enforcement of Compliance with Network Security Policies." This application is also related to U.S. application Ser. No. 11/271,610, filed Nov. 9, 2005, titled "Client Compliancy in an NAT Environment". This application is also related to U.S. aplication Ser. No. 11/270,918, filed Nov. 9, 2005, titled "Dynamic Endpoint Compliance Policy Configuration". Each of these applications is herein incorporated in its entirety by reference.

FIELD OF THE INVENTION

The invention relates to client compliancy, and more particularly, to a technique whereby security sensor data is used to enhance the compliancy determination in a client compliancy system.

BACKGROUND OF THE INVENTION

A client compliancy system is used to gate access to a protected network, such that only clients that are in compliance with a policy are allowed access to the protected network. Clients that are not in compliance are typically assigned to a quarantine network and provided with some remediation mechanism that should allow them to become compliant. Determination of a client's compliance can be done on the client itself, external to the client, or in combination. Generally, a client compliancy solution typically achieves this gating and remediation functionality without requiring any agent on the client so that the system can accommodate brand new, previously un-managed clients.

Intrusion detection system (IDS) sensors can be used to identify possible security breaches within a computer system or network, such as intrusions by external attackers and inappropriate use by internal personnel. In addition, vulnerability assessment (VA) techniques, sometimes referred to as scanning, are configured to assess the security of a computer system or network. In this sense, such IDS and VA techniques can be used to detect non-compliance. However, there is currently no efficient mechanism for communicating non-compliances to compliant clients and other elements on the network.

What is needed, therefore, are techniques that allow clients and other compliancy authentication elements to tell that a particular client appears to be out of compliance.

SUMMARY OF THE INVENTION

One embodiment of the present invention provides a method for enforcing client compliance on a network. The method includes storing non-compliance data from security sensors in a database, the non-compliance data including identifiers of non-compliant devices on the network. The method continues with receiving a query as to a target device's compliance status, the query including an identifier of the target device. The method continues with determining compliance status of the target device, based on the non-compliance data stored in the database and the identifier of the target device. The identifiers of non-compliant devices can be, for example, network addresses including at least one of MAC and IP addresses. In response to determining that the target device is compliant, the method may include assigning the target device to a protected network. In response to determining that the target device is non-compliant, the method may include assigning the target device to a quarantined network, and taking remedial steps to eliminate non-compliancy. The security sensors may include, for example, at least one of an intrusion detection system (IDS) sensor and a vulnerability assessment (VA) sensor. Non-compliance data from the security sensors can be received, for example, at least one of periodically according to a predetermined schedule and on a real-time basis as non-compliances are detected. Determining compliance status of the target device may include, for instance, comparing the identifier included in the query against identifiers in the database. In one particular embodiment, the query is sent by the target device itself as part of a self-policing compliance scheme. In one such case, and in response to the self-policing device receiving a status of non-compliance, the self-policing device requests at least one of a new network lease and remedial processing (e.g., a software updating procedure for current virus definitions, security patches, security software, and/or other security processing such as virus scanning, setting of security configurations to block pop-ups, active scripting, and uninstalling/reinstalling applications or components). A request for a new network lease may cause, for example, a proxy (e.g., 802.1X or DHCP) to assign the self-policing device to a quarantine network because that client is indicated as being non-compliant in the non-compliance database. Removal of a network device listing in the database can be based on that device's actual or assumed placement into remediation. For example, and in response to a self-policing device receiving a status of non-compliance, the self-policing compliance scheme includes removing the identifier of a self-policing device from the non-compliance database under the assumption that the self-policing device has or otherwise will put itself in abeyance with security policies of the network. Here, and in response to non-compliance of the target device subsequently being detected (e.g., by security sensors or other devices on the network), the method may further include re-admitting the self-policing device's identifier to the non-compliance database. Numerous self-policing client compliance schemes can be implemented, as will be apparent in light of this disclosure.

Another embodiment of the present invention provides a machine-readable medium (e.g., compact disk, diskette, server, or hard drive) encoded with instructions, that when executed by a processor, cause the processor to carry out a process for enforcing client compliance on a network. This process can be, for example, similar to or a variation of the previously described method.

Another embodiment of the present invention provides an apparatus for enforcing client compliance on a network. The apparatus includes a database for storing non-compliance data from security sensors, the non-compliance data including identifiers of non-compliant devices on the network. The apparatus further includes a compliance registration manager for receiving a query as to a target device's compliance status, and for determining compliance status of the target device, based on the non-compliance data stored in the database and an identifier of the target device. The identifier of the target device can be included, for example, in the query. Non-compliance data from the security sensors can be received, for example, at least one of periodically according to a predetermined schedule and on a real-time basis as non-compliances are detected. Determining compliance status of the target device by the compliance registration manager may include, for instance, comparing the identifier included in the query against identifiers in the database. In one particular configuration, removal by the compliance registration manager of a network device listing from the database is based on that device's actual or assumed placement into remediation. Self-policing client compliance schemes can be implemented, as previously explained. The database and compliance registration manager can be implemented, for example, in software (e.g., executable instructions encoded on a computer-readable medium), hardware (e.g., gate level logic), or other suitable means.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF THE INVENTION

Figure 1:
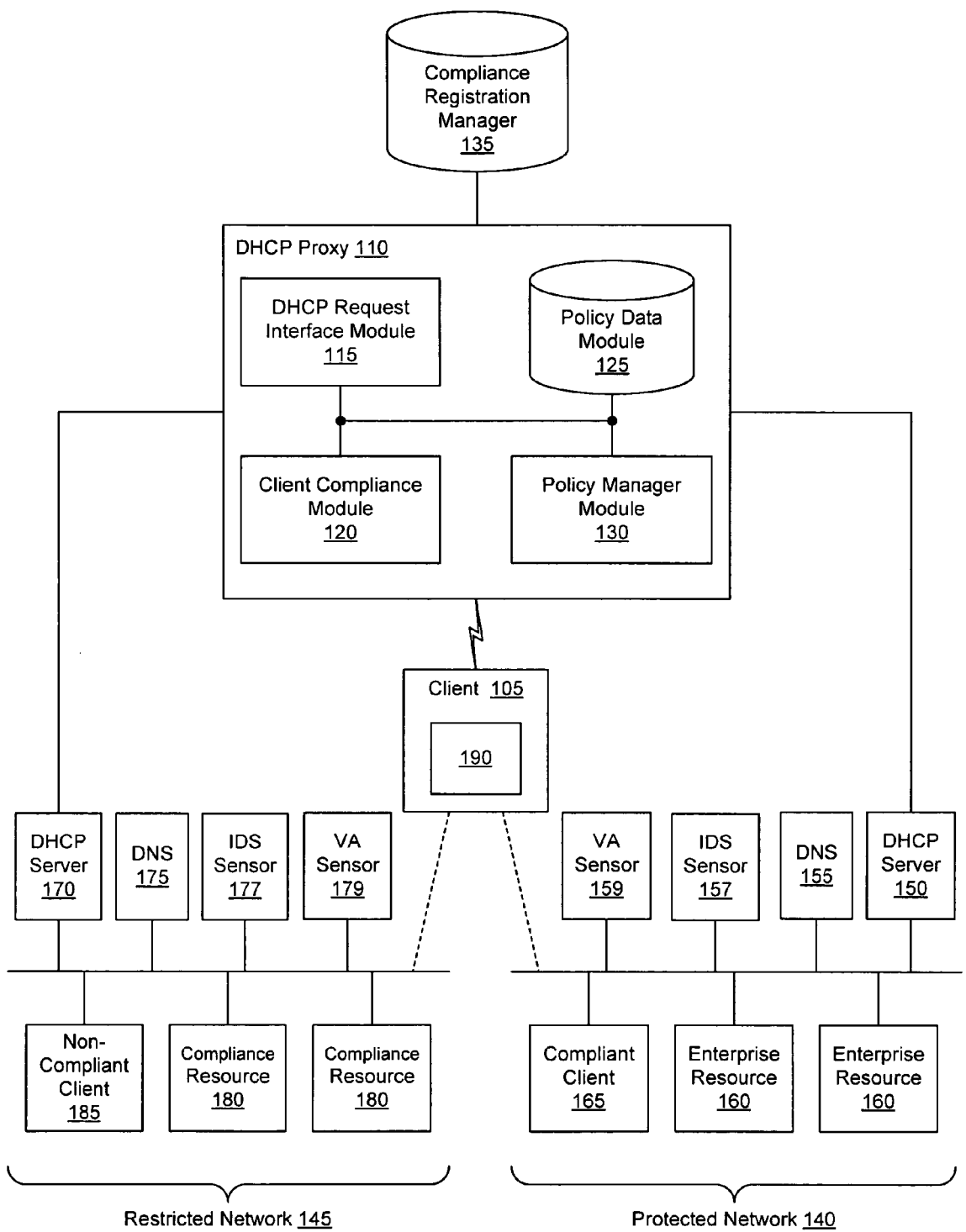
FIG. 1 shows a system configured for enforcing a set of computer network security policies, in accordance with one embodiment of the present invention.

Techniques are disclosed that allow clients and other compliancy authentication elements to tell that a particular client appears to be out of compliance. Security sensor data (e.g., from IDS, VA, and other security sensors) is used to enhance the compliancy determination in a client compliancy system. A non-compliance database is used to store the security sensor data.

General Overview

There are a number of reasons that a client may be out of compliance and unaware of the non-compliance. For example, antivirus may be installed and active, but the client's virus definition set may be stale; if such a client were infected with a new virus, the stale definitions would cause the virus to go undetected. Likewise, not all of the available operating system security patches may be installed. Other reasons for non-compliance may depend on the local network rules. For instance, the network administrator may require active scripting to be disabled, and visiting machines that connect ad hoc with the network may have their browsers and email clients configured with active scripting enabled.

Intrusion detection system (IDS) sensors on an internal network are able to detect activity indicative of an intrusion (e.g., by examining packets that are indicative of infection), and to note the compromised machine's IP and/or MAC address. Vulnerability assessment (VA) sensors that periodically scan the network can also be used to detect the IP and/or MAC addresses of machines that are out of compliance, such as machines running un-patched operating systems, running unauthorized services, machines with active scripting enabled, etc. The IDS and VA sensors may run, for example, on the suspect client machines, other client machines, and/or on dedicated IDS and VA machines/appliances. Numerous sensing schemes can be employed, as will be apparent in light of this disclosure. Further, note that other identifying information (as an alternative or supplement to network addresses such as IP and MAC addresses) can be used to identify non-compliant devices.

In any case, the list of IP/MAC addresses (or other identifiers) combined from the IDS, VA, and any other security sensing technologies is made available as a non-compliance database for query, so that clients and other compliancy authentication elements can tell that a particular client appears to be out of compliance. For instance, a self-policing client can periodically query the non-compliance database for its own IP address and get an indication that it is possibly compromised, infected, or otherwise under suspicion of non-compliance. If non-compliant, that self-policing client can take remedial steps. For instance, the self-policing client can issue a notification of non-compliance to the system, causing the client to be taken off the network or placed on to a quarantine network for remediation. Alternatively, or in addition to, the self-policing client can request a new network lease, thereby causing a proxy to assign it to the quarantine network (e.g., because the proxy will see that the self-policing client's identifier is in the non-compliance database). Alternatively, or in addition to, the self-policing client may use an indication of non-compliance to trigger a software updating procedure or other remedial processing. For instance, if a self-policing client is out of compliance, then it can be configured to request (or otherwise be given) new virus definitions and then perform a complete virus scan. In this sense, the self-policing client can put itself in abeyance of compliance policies.

The act of querying by a self-policing client can be carried out, for example, with a software agent running on the client. Client compliancy systems can rely completely on client-side self-policing. In such a self-policing scenario, a query by a client for the client's own status can result, for example, in the removal of that client from the non-compliance database under the assumption that the client has (or will timely do so in response to the indication of non-compliance) put itself in abeyance. If the client has not entered a remediation state, then the external security sensors can be used detect indicia of non-compliance thereby resulting in the client's re-admission to the non-compliance database. In this sense, a belt-and-suspenders approach can be used (self-policing combined with external security sensors). Alternatively, the removal of the client from the non-compliance database can be tied with that device's actual placement into remediation (rather than assumed placement). Various policing schemes can be used in conjunction with the non-compliance database, as will be apparent in light of this disclosure.

In client compliance systems that have an authentication step implemented as, for example, 802.1X or DHCP proxies, the non-compliance database can be consulted in addition to any other databases or mechanisms currently used by such systems for determination of compliance. In one such embodiment, a query from the proxy does not result in removal of the IP/MAC address from the non-compliance database. In this way, the system can distinguish self-query from proxy-based query by matching the IP being queried with the IP from which the query is issued.

The database and its query can be implemented in a number of ways. For example, the database of non-compliant IP addresses could be made available via a special DNS response, as is done for RBL queries (RBL=realtime blackhole list, which contains the IP addresses of known spammers). Any number of communication protocols (conventional or custom) can be used for submitting an IP address or MAC address to be checked against the database, and for responding with a status indication (compliant or non-compliant). This communication between a querying device and the non-compliance database can be sent directly between the device and the database, or by way of a proxy (e.g., DHCP or 802.1X), if applicable.

Example System Architecture

FIG. 1 shows a system configured for enforcing a set of computer network security policies, in accordance with one embodiment of the present invention. As can be seen, the system includes a DHCP proxy 110, a compliance registration manager 135, a client 105, and a protected network 140. In addition, the system optionally includes one or more restricted networks 145. In practice, for example, the protected network 140 is a corporate network that allows users to communicate and share information inside the protection of a corporate firewall. Typically, an administrator for the corporate network will outline a set of security policies with which users of the network must comply, e.g., by properly configuring their client 105 machines. Accordingly, given a set of security policies associated with the protected network 140, the system allows the network administrator to enforce compliance with the security policies by each client 105 that accesses the protected network 140. In one particular embodiment, the system enforces these security policies by assigning a client 105 to the protected network 140 or a restricted network 145 based on whether the client 105 is in compliance with the security policies.

Client 105 can be any type of computer, such as a computer system (e.g., desktop/lap), personal data assistant (PDA), portable phone, smart phone, and/or any other digital device capable of communicating with devices over a network. One client 105 is shown, but any number of clients 105 may be present. In addition, the network, including the protected and restricted networks 140,145, can be implemented with any type or combination of computer networking technology and protocols that allow for communications between the various network devices.

The protected network 140 includes a compliant client 165, a DHCP server 150, a domain name server (DNS) 155, and a set of enterprise resources 160. In one such embodiment, the enterprise resources 160 include resources such as a corporate intranet, licensed software, shared storage, and an email server. In addition, the protected network 140 includes an IDS sensor 157 and a VA sensor 159. The restricted network 145 includes a non-compliant client 185, a DHCP server 170 and a DNS 175. As can be seen, the non-compliant client 185 does not have access to the full set of enterprise resources 160. Rather, the restricted network 145 provides access only to a set of compliance resources 180. These compliance resources 180 include some or all of the resources that a non-compliant client 185 needs to become in compliance with the security policies. Such resources 180 include, for example, anti-virus software and virus definitions, personal firewall software, client software, software updates and patches, and network configuration settings. The restricted network 145 also includes an IDS sensor 177 and a VA sensor 179.

Variations on this implementation will be apparent in light of this disclosure. For example, although separate DHCP servers 150,170 and DNSs 155,175 are shown for the protected and restricted networks 140,145, respectively, these components may actually be implemented in the same systems. In addition, the sensors 157,159 or protected network 140 can be installed or otherwise integrated into, for instance, client 165 or the server 150. Likewise, the sensors 177,179 of the restricted network 145 can be integrated into client 185 or the server 170. As previously explained, these security sensors detect violations of the security policies. Numerous types of such sensors can be used.

In one embodiment, each of the protected network 140 and the restricted network 145 is a logical network that may or may not share the same or a portion of the same physical network. Separate logical networks can be implemented as virtual local area networks (VLANs). A VLAN is a logical subgroup within a local area network that is created by software rather than physical connections. A VLAN combines user stations and network devices into a single unit regardless of the physical LAN segment to which they are attached and allows traffic to flow more efficiently within populations of mutual interest. The use of VLANs allows network administrators to divide an enterprise's physical network resources into separate logical networks for segregating clients 105 based on their compliance with the security policies.

The DHCP proxy 110 is used to segregate compliant clients 165 from non-compliant clients 185 so that the protected network 140 is protected from the risks of security policy violations. The DHCP proxy 110 operates by assigning network access to a client 105 based on the client's compliance with the security policies. The DHCP proxy 110 comprises a DHCP request interface module 115, a client compliance module 120, a policy data module 125, and a policy manager module 130. Each module is communicatively coupled to one another. As used herein, a module may be implemented in hardware, software, firmware, or any combination thereof. In addition, any of the modules or a portion thereof may be stored and/or executed by a remote device coupled to any part of the system. The DHCP proxy 110 may be implemented in a network appliance (such as a router, a switch, or a network firewall device), in a DHCP server itself, or in a software program coupled to the networks 140,145.

The security policies are definable by the network administrator. In one embodiment, the security policies are rules-based, which allows them to be created and modified easily. These policies may include rules related to proper configuration of software on the client (including enabling of particular features and specifying values for settings thereon), installation on the client of security software or other software programs (including anti-virus software and personal firewall software), updates for the security software or other software programs (including versions of the software and operating system security patches), and virus definitions. Additionally, the security policies can be configured to enforce software license agreements, where the security policies include rules related to installation on the client of licensed software and available site licenses for the licensed software. Definitions for the security policies can be stored electronically for access by any system component that requires them. In the embodiment shown, the security policies are stored in the policy data module 125 of the DHCP proxy 110, but such policies can be stored anywhere they are accessible to the system. The policy manager module 130 is responsible for updating the security policies in the policy data module 125 and transmitting the updated policies to the clients 105. The security policies may also be stored on each client 105.

The DHCP request interface module 115 is configured to receive a DHCP request for an IP address from a client. The client compliance module 120 is configured to retrieve, responsive to the DHCP request, compliance data from the compliance registration manager 135, the compliance data indicating whether the client is in compliance with the set of security policies. Responsive to the retrieved compliance data indicating that the client is in compliance with the set of security policies, the DHCP request interface module 115 assigns the client a logical address on the protected network 140. In this case, the DHCP request interface module 115 obtains the logical address on the protected network 140 from the DHCP server 150 for the protected network. In one embodiment, and as previously explained, the client compliance module 115 retrieves compliance data for a particular client by querying the compliance registration manager using a MAC address associated with the client. In response to the retrieved compliance data indicating that the client is not in compliance with the set of security policies, the DHCP request interface module 115 can perform a number of actions, as will be apparent in light of this disclosure. For instance, the DHCP request interface module 115 can deny the client's DHCP request for an IP address, and/or assign the client a logical address on the restricted network 145. In this case, the DHCP request interface module 115 obtains the logical address on the restricted network 145 from the DHCP server 170 for the restricted network 145.

The compliance registration manager 135 is capable of storing the compliance data for a number of clients. The compliance data for each client 105 indicates the identity of the client 105 and whether the client 105 is in compliance with the security policies. In one embodiment, each client is identified by a MAC and/or IP address associated with the client. In addition to storing this compliance data, the compliance registration manager 135 accepts queries for a client's compliance (e.g., based on the client's MAC/IP address), and returns the compliance status for the client 105, by way of client compliance module 120. The compliance registration manager 135 also accepts commands for updating compliance data entries and creating new ones, by way of client compliance module 120. Note that in other embodiments, the client compliance module 120 and compliance registration manager 135 can be programmed or otherwise integrated into a single module. Numerous configurations will be apparent in light of this disclosure.

In one particular embodiment, a list of IP/MAC addresses combined from the IDS and VA sensors 157,159,177,179 (and/or any other security sensing technologies) is made available by the compliance registration manager 135 (e.g., via the client compliance module 120) as a non-compliance database. Thus, the presence of a client's MAC and/or IP address in the non-compliance database (e.g., as reported in response to a query) is indicative of that device's non-compliant status.

The system includes a compliance verification component 190, which in this embodiment is implemented as a computer program that runs on the client 105 (and other clients, such as compliant client 165 and non-compliant client 185). The compliance verification component 190 uses the security policies to determine whether the client 105 is in compliance with the policies. The compliance verification component 190 may be provided with a static set of security policies. Alternatively, the security policies can be stored in an updateable store that queries the policies from a central store. Such a query can be performed in one example using the Lightweight Directory Access Protocol (LDAP), which is used to access directory listings and is supported by directory products such as Directory Server by Sun Microsystems and Active Directory by Microsoft. Alternatively, the compliance verification component 190 can be adapted to obtain the security policies in real-time (e.g., from the policy data module 125 of the DHCP proxy 110), without storing the policies on the client system 105.

Methodology

Figure 2:
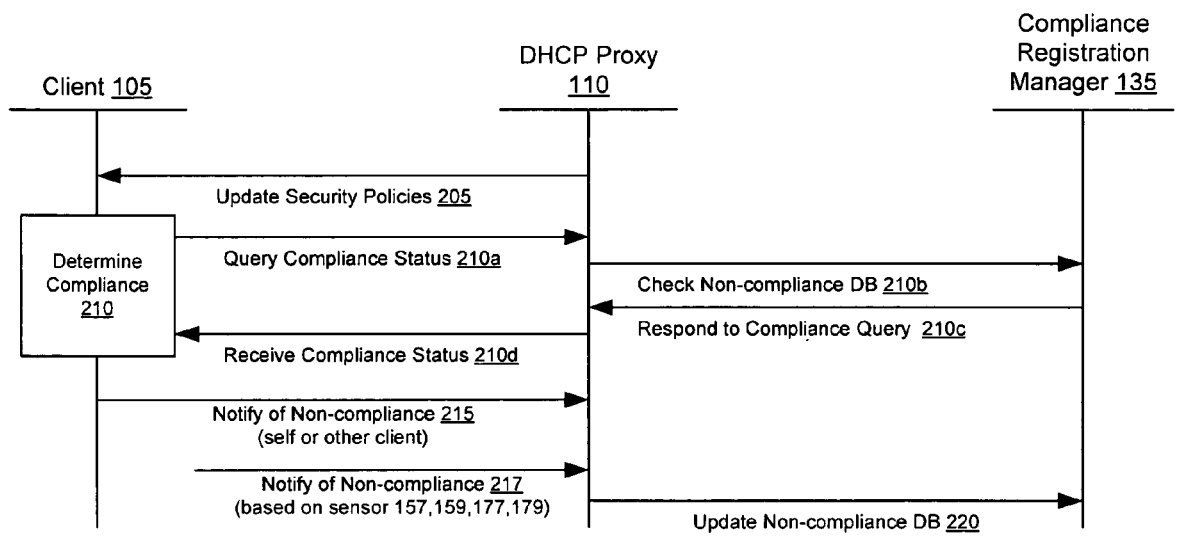
FIG. 2 is a timing diagram of a process for updating a client's compliance data according to one embodiment of the present invention.

FIG. 2 is a timing diagram of a process for updating a client's compliance data according to one embodiment of the present invention. Optionally, before the compliance data for a client 105 is determined, the compliance verification component 190 updates 205 to a current version of the security policies. Thereafter, the compliance verification component 190 determines 210 whether the client is in compliance with the security policies. This step 210 may be performed at any time a network administrator determines appropriate. For example, the compliance verification component 190 can be programmed other otherwise configured to determine 210 compliance in response to a request from the DHCP proxy 110 for the client's compliance data. Alternatively, step 210 can be performed at predetermined time intervals, upon startup of the client 105 or upon connection of client 105 to the network, upon DHCP requests, in response to various events (e.g., every load of system software), or a combination thereof (e.g., after a day if no reload occurred within a day).

In the embodiment shown, step 210 is carried out by the verification component 190, as follows. A query 210a for compliance status is issued by the verification component 190 of client 105. The query includes the MAC and/or IP address (or other identifier) of the target device. Note that this query can be a self-query (where device 105 is checking its own compliance status), or a query relevant to another device on the network. The DHCP proxy 110 processes the query and checks 210b the non-compliant database (of the compliance registration manager 135). In this particular embodiment, the check includes comparing the MAC and/or IP address of the target device to the list of MAC and/or IP addresses stored in the non-compliant database. If a match is found, then the target device is non-compliant. Otherwise, the device has a status of compliant. In any case, the compliance registration manager 135 responds 210c with the compliance status of the target device. The DHCP proxy 110 processes the response and the verification component 190 of client 105 receives 210d the requested compliance status data.

Note that the compliance verification component 190 can also independently determine 210 whether the target client is in compliance, and then notify 215 the DHCP proxy 110 by transmitting the compliance data. As explained above, the compliance data identifies the target client 105 (e.g., based on MAC/IP address) and whether it is in compliance (e.g., compliance bit set to logical one if compliant, and logical zero if non-compliant). In one embodiment, the target client 105 is associated with one or more MAC addresses. For example, the client 105 may be a computer system having a network card installed, where the network card has a MAC address. The MAC address operates as a globally unique serial number, so it is well suited for identifying a client system 105. The process may also include notifying 217 of non-compliance based on sensor data (e.g., 157,159,177,179). This type of notification also includes, for example, MAC and/or IP address information of a device on the network that has been detected as non-compliant (based on sensor data). In either (or both) compliance notification cases, the DHCP proxy 110 then proceeds with updating 220 the non-compliance database for the client 105 with the compliance registration manager 135.

Figure 3:
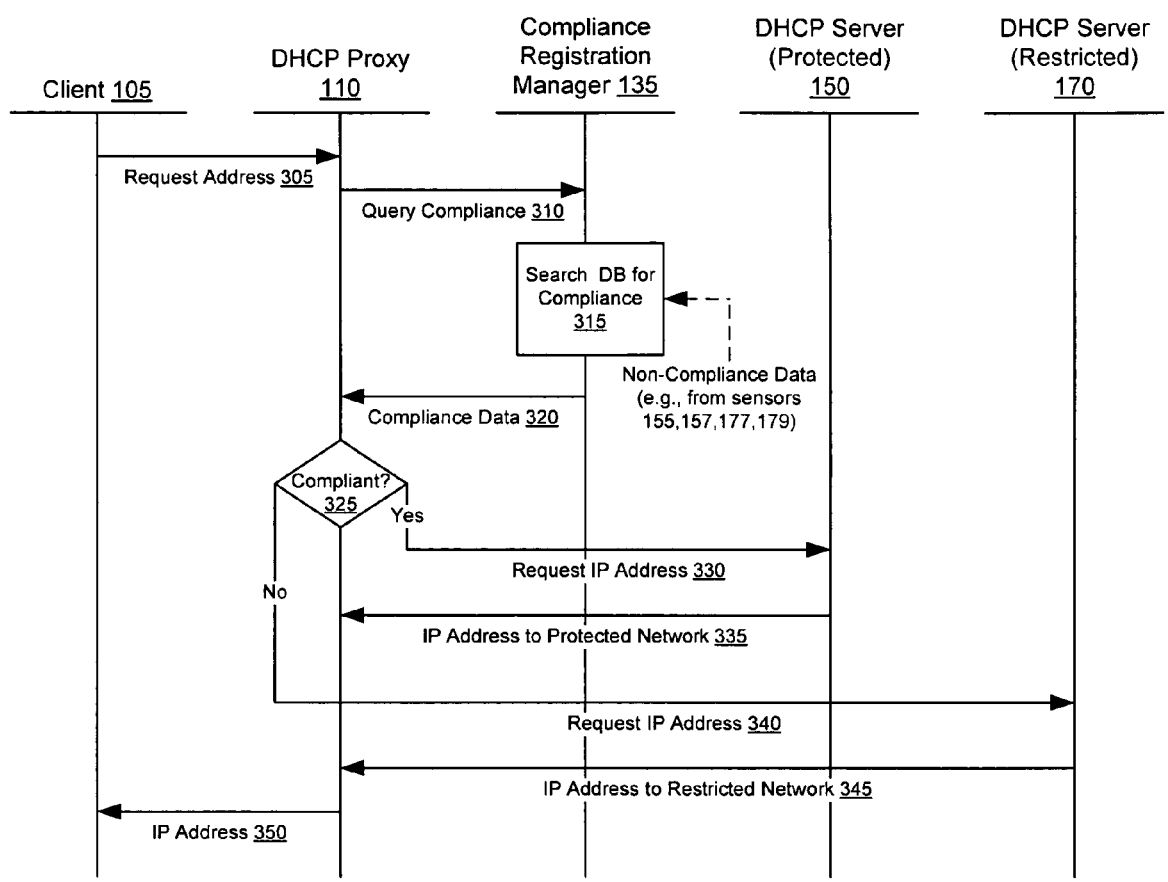
FIG. 3 is a timing diagram of a process for assigning a network address to a client according to one embodiment of the present invention.

FIG. 3 is a timing diagram of a process for assigning a network address to a client according to one embodiment of the present invention. As can be seen, this process is described in the context of requesting an IP address using the DHCP; however, the invention is not limited to this protocol. Rather, an embodiment of the invention is understood to enable the enforcement of network security policies by assigning network access based on a client's compliance with the policies, regardless of any particular implementation. The DHCP and use of one or more VLANs are just suitable tools for assigning network access to clients. Other authentication protocols/proxies, such as 802.1X can also be used.

In this particular embodiment, a client 105 that does not have a static IP address can access a network by requesting 305 an IP address from a DHCP server for that network (sometimes referred to as requesting a network lease). The DHCP proxy 110 is configured to intercept the DHCP request 305 from the client 105. Before providing the client 105 with an IP address, the DHCP proxy 110 first queries 310 the compliance registration manager 135 for the compliance data associated with the client 105. This query includes an identifier for the particular client 105. In one embodiment, this client-specific identifier is the client's MAC address, which is normally included in a DCHP request packet and thus available to the DHCP proxy 110. The client's IP address can also be used as a client-specific identifier.

In response to the query 310, the compliance registration manager 135 searches 315 its database for an entry corresponding to the requesting client 105. As can be seen, the compliance database can receive compliance data (e.g., MAC/IP addresses and corresponding compliance status) from any one or combination of sensors 155,157,177,179. As previously explained, such sensors can be integrated into a client 105, or can be implemented as a dedicated sensor module on various sections of an overall network (e.g., on the restricted 145 and protected 140 sections as shown in FIG. 1). If the entry is found, the compliance registration manager 135 returns 320 the compliance status that corresponds to the entry to the DHCP proxy 110. If an entry for the requesting client is not found, the client is treated as not compliant. Accordingly, the compliance registration manager 135 returns 320 a non-compliant status associated with the requesting client 105. Alternatively, if an entry for the requesting client is not found, the compliance registration manager 135 may request that the client 105 determine its compliance (e.g., according to the process of FIG. 2). In such a case, the compliance registration manager 135 waits until it receives the compliance data from the client 105 or until a timeout occurs before returning 320 the client's compliance data to the DHCP proxy 110.

Upon determining 325 that the requesting client 105 is compliant with the security policies, the DHCP proxy 110 requests 330 an IP address from the DHCP server 150 on the protected network 140, which then returns 335 an IP address to the DHCP proxy 110 if one is available. Upon determining 325 the requesting client 105 is not compliant with the policies, or if the client 105 is compliant but no IP address on the protected network 140 is available, the DHCP proxy 110 requests 340 an IP address from the DHCP server 170 on the restricted network 145. This DHCP server 170 then returns 345 an IP address associated with the restricted network, if any are available. In the event that no IP addresses were available, the client 105 cannot access any network 140,145, but the client 105 may repeat this requesting process at a later time or periodically until access is granted.

The DHCP proxy 110 then provides 350 the requesting client 105 with the obtained IP address. Using this address in accordance with the DHCP, the client 105 accesses either the protected network 140 or the restricted network 145, depending on the address obtained. Accordingly, the result of this process is that if the client 105 is compliant with the security policies (according to the latest compliance data in the compliance registration manager 135), the client 105 is assigned to the protected network 140 if an address for that network 140 is available. Otherwise, the client 105 is assigned to the restricted network 145, or the client's DHCP request is denied.

In some cases, the network administrators may not be able to implement a VLAN or otherwise enable logically separate networks. In other cases, there will simply only be one network (as opposed to protected and restricted networks). Accordingly, an embodiment of the invention includes a protected network 140 only. In such a case, a client 105 that is determined to not be in compliance with the security policies is not assigned any network address, and therefore that client 105 would have no network access. Alternatively, the DHCP proxy 110 (or other such mechanism) can be configured to provide very short-term address leases on the protected network 140 to non-compliant clients 185. This short-term lease is useful, for example, for systems in which the creation of a restricted network 145 is not feasible, as it allows a client 105 to use the protected network 140 for a short time (and in a monitored or otherwise restricted fashion) to comply with the security policies.

In another variation of the process shown in FIG. 3, a number of restricted networks 145 are provided. In one such embodiment, each client 105 that is determined to be non-compliant is assigned to its own restricted network 145. Although this requires that the system to support a large number of logical networks, e.g., VLANs, it provides the added benefit of protecting non-compliant clients 185 from each other. For example, some clients 185 might be non-compliant for relatively minor infractions of the security policies, while others might be much more susceptible to attacks by malicious code due to major infractions. Shielding non-compliant clients 185 from each other thus provides an added protection.

In another embodiment, a client 105 is automatically assigned to the restricted network 145 (e.g., upon startup) and thereafter may request access to the protected network 140 (which request is granted only if the client 105 is compliant with the security policies). This is implemented, for example, by configuring the DHCP proxy 110 to retrieve an address on the restricted network 145 responsive to the client's first DHCP request. Accordingly, the client 105 is assigned to the restricted network 145 regardless of its compliance with the policies. The DHCP proxy 110 obtains the address on the restricted network 145 from that network's DCHP server 170. The DHCP proxy 110 provides the client 105 with that address, giving the client 105 access to the restricted network 145 only. Thereafter, the client 105 may request an IP address on the protected network 140 by making another DHCP request. This request is also intercepted by the DHCP proxy 110, which retrieves an address from the DHCP server 150 for the protected network 140 if the client 105 is determined to be in compliance with the security policies. Otherwise, the DHCP proxy 110 denies the request, and the client 105 continues to use the address on the restricted network 145 that was originally obtained.

Figure 4A:
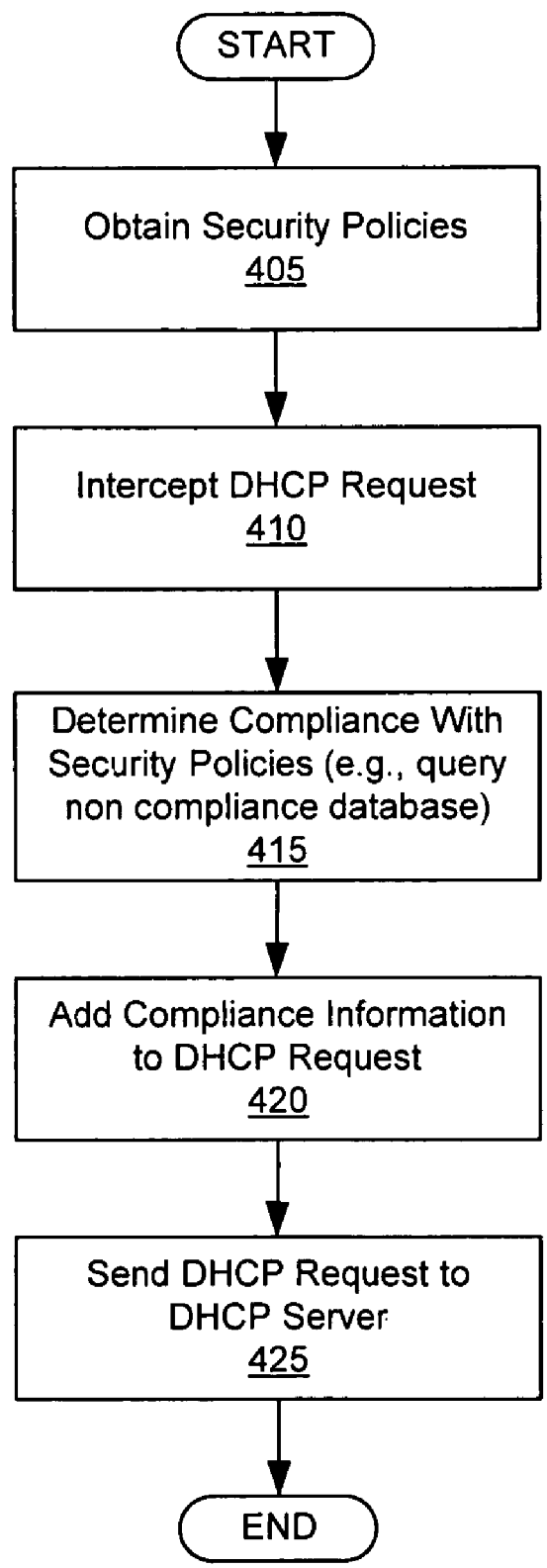
FIG. 4a illustrates a method for requesting a network address by a client, in accordance with one embodiment of the present invention.

FIG. 4a illustrates a method for requesting a network address by a client 105, in accordance with one embodiment of the present invention. The method can be carried out, for example, by a compliance verification component 190 that executes or runs on the client computer 105. In this embodiment, the compliance verification component 190 first obtains 405 the security policies, available for example from the policy data module 125 of the DHCP proxy 110. The component 190 can store these security policies and periodically update them, or it can obtain 405 the policies real-time before performing this process.

When the client system 105 makes a DHCP request over its network connection, the component 190 intercepts 410 this request. The component 190 can use any suitable method to intercept 410 the request, including using Libpcap functions to "hook" the network stack, implementing a network card shim, hooking the TDI layer, using MICROSOFT Firewall APIs or proprietary APIs, replacing Winsock, and implementing a Winsock-layered provider. A variety of known or custom techniques for intercepting 410 DHCP requests can be used here.

Using the obtained security policies, the component 190 determines 415 whether the client 105 is in compliance with the policies. Alternatively, this determination may be performed periodically (e.g., before any DHCP request), and the compliance data are stored, e.g., on the client 105. Then, this step 415 can be performed quickly by merely checking the stored compliance data, rather than checking the security policies against the client 105 only after a DHCP request. This might be useful where the rule defining the security policies are extensive, as it helps to reduce the delay between a DHCP request and the client's obtaining an actual IP address. In any case, the determination can be carried out as discussed with reference to FIG. 2 (by querying the non-compliance database).

Using the obtained compliance data for the client 105, the component 190 adds 420 the compliance data to the DHCP request. Modifying the DHCP request can be performed, for example, by modifying the corresponding packet on the network stack. This modified DHCP request is then sent 425 to a DHCP server by way of the DHCP proxy 110. Alternatively, the component 190 can send a separate packet that contains the client's compliance data. The DHCP proxy 110 is configured to route the DHCP request to a DHCP server 150,170 on the protected or restricted network 140,145, depending on whether the client is in compliance with the security policies. Accordingly, the client 105 will be given an IP address on the protected network 140 (and thus access thereto) if the client 105 is in compliance; otherwise, the client 105 will only have access to a restricted network 145 or none at all.

Figure 4B:
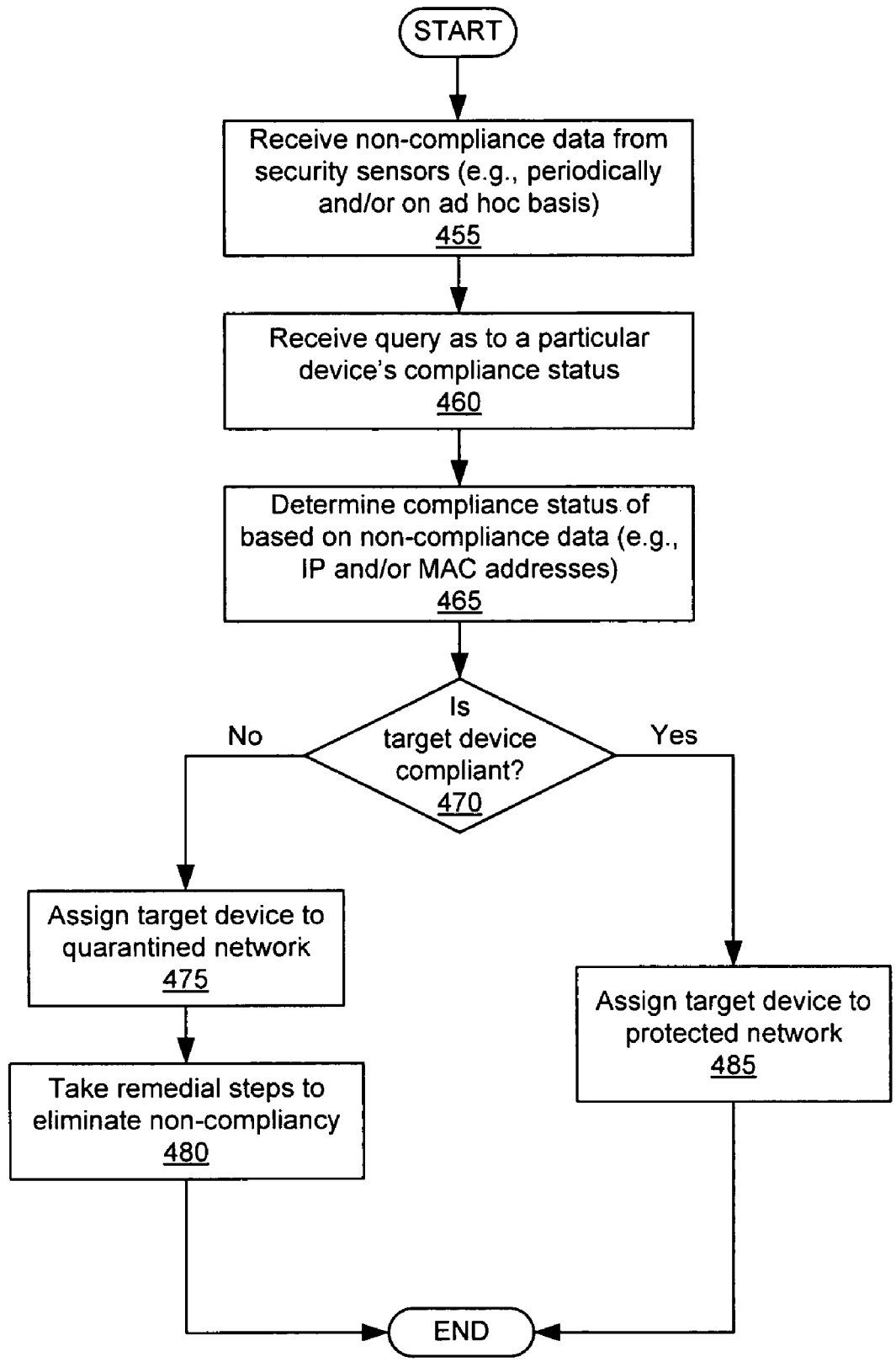
FIG. 4b illustrates a method for enforcing client compliance, in accordance with one embodiment of the present invention.

FIG. 4b illustrates a method for enforcing client compliance, in accordance with one embodiment of the present invention. The method can be carried out, for example, by a compliance registration manager 135 as discussed with reference to FIG. 1.

In this particular embodiment, the method includes receiving 455 non-compliance data from security sensors (e.g., IDS and/or VA sensors). In one embodiment, the non-compliance data includes MAC and/or IP addresses of non-compliant devices on the network. However, other identifiers will be apparent in light of this disclosure. For instance, each device on the network can be associated with a unique randomly generated code, or a unique name assigned by a network administrator. The identifier can generally be any data that can be used to uniquely identify a device. Receipt of non-compliance data may occur, for example, periodically (e.g., according to a predetermined schedule) and/or on an ad hoc basis (e.g., reported by sensors in real-time as non-compliances are identified). The method continues with receiving 455 a query as to a particular device's compliance status. This query can be sent by the target device itself (e.g., self-policing client as previously discussed), or by some other network device (e.g., such as an 802.1X or DHCP proxy). In one embodiment, the query includes the MAC or IP address of the target device.

The method continues with determining 465 compliance status of the target device, based on non-compliance data (e.g., compliance status indexed by IP and/or MAC addresses). In one embodiment, this determination includes comparing the IP or MAC addresses included in the query against IP/MAC addressed in a non-compliance database.

Based on the comparison, the method continues with determining 470 whether the target device compliant. For instance, if the address is present in the database, then the target device is non-compliant. If the address is not present in the database, then the target device is compliant. Recall that the act of querying can be carried out, for example, with a software agent running on the target client. In such a self-policing scenario, a query by a client for the client's own status can result, for example, in the removal of that client from the non-compliance database under the assumption that the client has/will put itself in abeyance. As previously explained, if the client has not entered a remediation state, then the external security sensors (e.g., IDS, VA, or other sensors) can be used detect indicia of non-compliance thereby resulting in the client's re-admission to the non-compliance database. Alternatively, the removal of the client from the non-compliance database can be tied with that device's placement into remediation. In client compliance systems that have an authentication step such as 802.1X or DHCP proxies, a query from the proxy does not result in removal of the IP/MAC address from the non-compliance database. In this way, the compliance system can distinguish self-query from proxy-based query by matching the IP being queried with the IP from which the query is issued.

Also, recall that a self-policing client can periodically request a new network lease (or request a new network lease in response to an indication of non-compliance), thereby causing the proxy (e.g., 802.1X or DHCP) to assign it to the quarantine network, if that client is in the non-compliance database. Also, recall that a self-policing client may use an indication of non-compliance to trigger a software updating procedure or other processing (e.g., request updated virus definitions and then perform a complete virus scan, download current security patches for operating system or browser, disable active scripting, enable pop-up blocking, trigger an automatic uninstall and then reinstall of a particular application or component due to corruption, request user to perform uninstall/install, automatically subscribe to Internet security service, etc). Such functionality (e.g., as carried out or triggered by a compliance verification component 190 or other client-side module configured for requesting a new network lease and/or remedial processing) enables a client-side self-policing compliance scheme that requires no or little administrator intervention. This self-policing compliance scheme can be further supplemented with the addition of security information services that deliver real-time threat data (e.g., such as Symantec DeepSight Alert Service and other early warning services that deliver timely and actionable security alerts). In this way, the self-policing compliance system will have compliance policies that protect its customers' machines from the very latest threats at any moment in time. One such system that employs security information services is described in the previously incorporated U.S. application Ser. No. 11/271,610, filed Nov. 9, 2005, titled "Dynamic Endpoint Compliance Policy Configuration". Thus, a client-side self-policing compliance system used in conjunction with automated endpoint compliance policy configuration as described therein can be implemented to further reduce system administrator burden.

In response to determining 470 that the target device is non-compliant, the method continues with assigning 475 the target device to a quarantined network, and taking 480 remedial steps to eliminate non-compliancy. Example remedial steps may include updating/installing anti-virus software and virus definitions, personal firewall software, software security patches, and network configuration settings. In response to determining 470 that the target device is compliant, the method continues with assigning 485 the target device to a protected network.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A method for enforcing client compliance on a network, comprising:
    storing to a database, identifiers of non-compliant devices on the network detected by security sensors, the security sensors including at least one of an intrusion detection system (IDS) sensor and a vulnerability assessment (VA) sensor;
    receiving, over the network, a query from a self-policing target device, the query requesting a compliance status of the self-policing target device from the database of non-compliant devices, and the query including an identifier of the self-policing target device;
    comparing the identifier of the self-policing target device in the query against the identifiers of the non-compliant devices in the database;
    determining a compliance status of the self-policing target device based on the identifiers of the non-compliant devices stored in the database and the identifier of the self-policing target device, the compliance status indicating whether or not the identifier of the self-policing target device is included in the database of non-compliant devices detected by the security sensors; and
    transmitting, over the network, the compliance status to the self-policing target device, wherein in response to the status indicating that the identifier of the self-policing target device is included in the database of non-compliant devices detected by the security sensors, the self-policing target device initiates a remedial action to put itself in compliance with network security policies.

2. The method of claim 1 further comprising:
    in response to determining that the self-policing target device is compliant, assigning the target device to a protected network.

3. The method of claim 1 further comprising:
    in response to determining that the self-policing target device is non-compliant, assigning the self-policing target device to a quarantined network; and
    taking remedial steps to eliminate non-compliancy.

4. The method of claim 1 wherein the identifiers of the non-compliant devices are received from the security sensors at least one of periodically according to a predetermined schedule and on a real-time basis as non-compliances are detected.

5. The method of claim 1, wherein in response to transmitting a compliance status indicating that the identifier of the self-policing target device is included in the database of non-compliant devices detected by the security sensors, and receiving a request from the self-policing target device, providing to the self-policing target device at least one of a new network lease and remedial processing.

6. The method of claim 5 wherein the request for new network lease causes a proxy to assign the self-policing target device to a quarantine network.

7. The method of claim 1, further comprising:
    removing the self-policing target device listing in the database in response to the self-policing target device placing itself into remediation.

8. The method of claim 1 wherein the identifiers of non-compliant devices are network addresses including at least one of MAC and IP addresses.

9. The method of claim 1, further comprising:
    removing the identifier of the self-policing target device from the database in response to receiving the query from the self-policing target device; and
    re-admitting the identifier of the self-policing target device to the database in response to the security sensors subsequently detecting non-compliance of the self-policing target device.

10. The method of claim 1, wherein the identifier of the self-policing target device comprises a MAC address of the self-policing target device.

11. A non-transitory machine-readable storage medium encoded with instructions, that when executed by a processor, cause the processor to carry out a process for enforcing client compliance on a network, the process comprising:
    storing to a database, identifiers of non-compliant devices on the network detected by security sensors, the security sensors including at least one of an intrusion detection system (IDS) sensor and a vulnerability assessment (VA) sensor;
    receiving, over the network, a query from a self-policing target device, the query requesting a compliance status of the self-policing target device from the database of non-compliant devices, and the query including an identifier of the self-policing target device;
    comparing the identifier of the self-policing target device in the query against the identifiers of the non-compliant devices in the database;
    determining a compliance status of the self-policing target device based on the identifiers of the non-compliant devices stored in the database and the identifier of the self-policing target device, the compliance status indicating whether or not the identifier of the self-policing target device is included in the database of non-compliant devices detected by the security sensors; and
    transmitting, over the network, the compliance status to the self-policing target device, wherein in response to the status indicating that the identifier of the self-policing target device is included in the database of non-compliant devices detected by the security sensors, the self-policing target device initiates a remedial action to put itself in compliance with network security policies.

12. The non-transitory machine-readable storage medium of claim 11, the process further comprising:
    in response to determining that the self-policing target device is compliant, assigning the target device to a protected network.

13. The non-transitory machine-readable storage medium of claim 11, the process further comprising:
    in response to determining that the self-policing target device is non-compliant, assigning the self-policing target device to a quarantined network; and
    taking remedial steps to eliminate non-compliancy.

14. The non-transitory machine-readable storage medium of claim 11 further comprising:
    removing the self-policing target device listing in the database in response to the self-policing target device placing itself into remediation.

15. The non-transitory machine-readable storage medium of claim 11, the process further comprising:

removing the identifier of the self-policing target device from the database in response to receiving the query from the self-policing target device; and re-admitting the identifier of the self-policing target device to the database in response to the security sensors subsequently detecting non-compliance of the self-policing target device.

16. The non-transitory machine-readable storage medium of claim 11, wherein the identifier of the self-policing target device comprises a MAC address of the self-policing target device.

17. An apparatus for enforcing client compliance on a network, comprising:

a processor;

a memory comprising a database for storing identifiers of non-compliant devices on the network detected by the security sensors, the security sensors including at least one of an intrusion detection system (IDS) sensor and a vulnerability assessment (VA) sensor; and a computer-readable storage medium storing a computer-executable program module executable by the processor, the program module including a compliance registration manager that when executed by the processor causes the processor to perform steps of:

receiving, over the network, a query from a self-policing target device, the query requesting a compliance status of the self-policing target device from the database of non-compliant devices, and the query including an identifier of the self-policing target device;

comparing the identifier of the self-policing target device in the query against the identifiers of the non-compliant devices in the database;

determining a compliance status of the self-policing target device based on the identifiers of the non-compliant devices stored in the database and the identifier of the self-policing target device, the compliance status indicating whether or not the identifier of the self-policing target device is included in the database of non-compliant devices detected by the security sensors; and transmitting, over the network, the compliance status to the self-policing target device, wherein in response to the status indicating that the identifier of the self-policing target device is included in the database of non-compliant devices detected by the security sensors, the self-policing target device initiates a remedial action to put itself in compliance with network security policies.

18. The apparatus of claim 17 wherein the identifiers of the non-compliant devices are received from the security sensors at least one of periodically according to a predetermined schedule and on a real-time basis as non-compliances are detected.

19. The apparatus of claim 17 wherein the compliance registration manager when executed further causes the processor to perform a step of:

removing the self-policing target device listing from the database in response to the self-policing target device placing itself into remediation.

20. The apparatus of claim 17, wherein the identifier of the self-policing target device comprises a MAC address of the self-policing target device.

* * * * *